Figure 1:
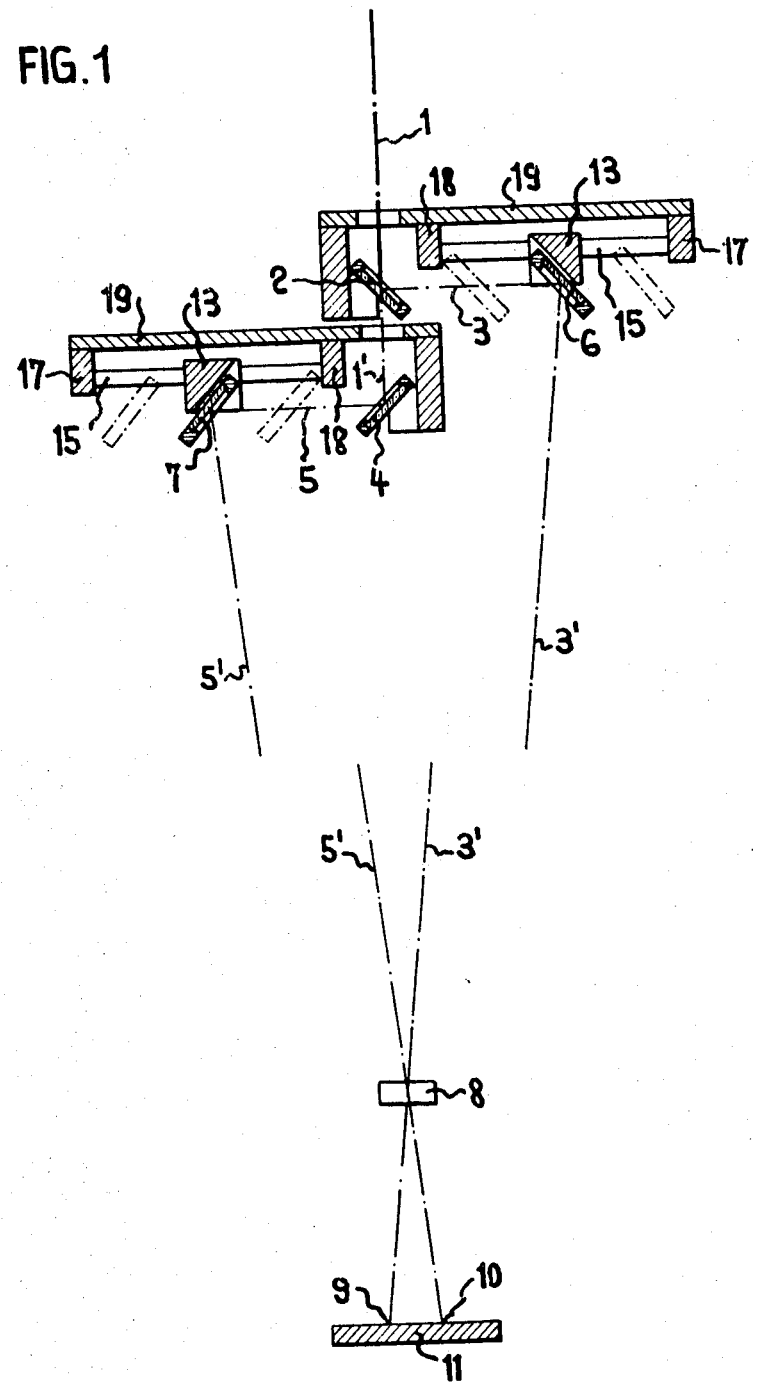

United States Patent

[11] 3,622,740

| [72] | Inventors | Pierre E. Ravussin<br>Lausanne;<br>Robert Capua, Prilly, both of Switzerland |
|---|---|---|
| [21] | Appl. No. | 22,497 |
| [22] | Filed | Mar. 25, 1970 |
| [45] | Patented | Nov. 23, 1971 |
| [73] | Assignees | OMEGA Louis Brandt & Frere S.A.<br>Lausanne, ;<br>ALCYON, Electronique et Physique SA<br>Renens, Switzerland |
| [32] | Priority | Apr. 1, 1969 |
| [33] | | Switzerland |
| [31] | | 4950/69 |

[54] APPARATUS FOR TREATING WORKPIECES BY LASER ENERGY
5 Claims, 4 Drawing Figs.

[52] U.S. Cl. .................................................. 219/121 L
[51] Int. Cl. .................................................. B23k 9/00
[50] Field of Search .......................................... 219/121 L, 121 EB

[56] References Cited
UNITED STATES PATENTS

| 3,256,524 | 6/1966 | Stauffer ...................... | 346/76 |
| 3,262,122 | 7/1966 | Fleisher et al. .............. | 346/1 |
| 3,364,497 | 1/1968 | MacAdam ...................... | 346/108 |
| 3,463,898 | 8/1969 | Takaoka et al. .............. | 219/121 |

Primary Examiner—J. V. Truhe
Assistant Examiner—Lawrence A. Rouse
Attorney—Imirie and Smiley ABSTRACT: A device for substantially increasing the efficiency, output and quality when treating workpieces by means of laser energy, particularly when welding or boring workpieces, wherein the laser beam from one single laser source is subdivided into a number of individual beams for simultaneously treating a number of places of one or more workpieces.

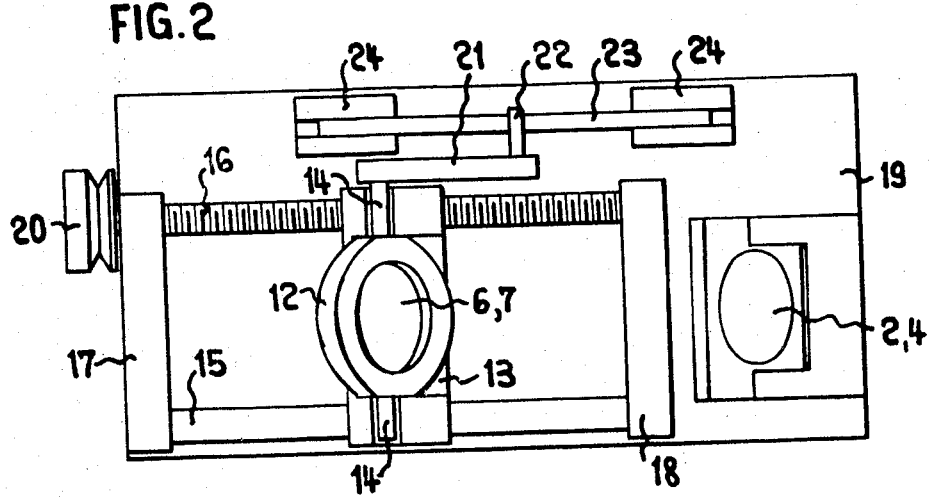
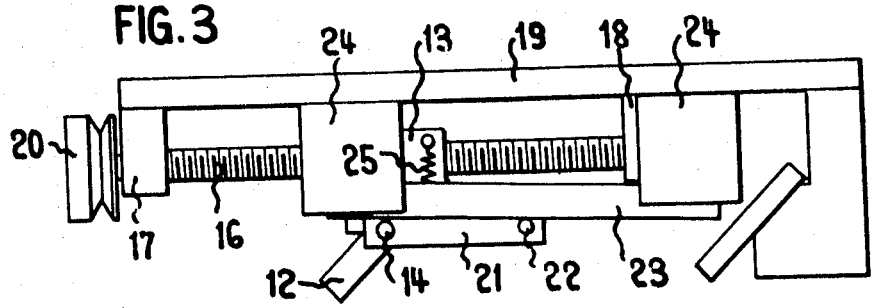
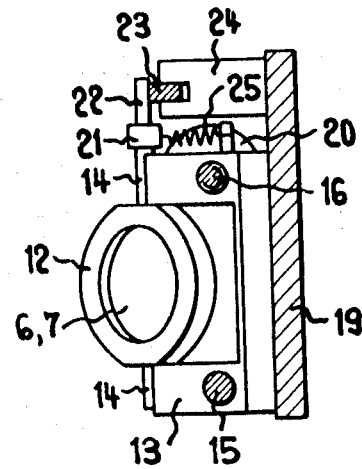

APPARATUS FOR TREATING WORKPIECES BY LASER ENERGY

This invention relates to a method and device for treating workpieces by laser energy. This energy form is used more and more for various purposes, particularly for boring, welding and cutting. The use of laser energy is of particular interest not only for treating materials which are difficult to work by other methods, but also for small parts such as watch parts where small energies are needed for welding or boring. However, a number of difficulties of technical and economic character are encountered.

Laser sources are highly expensive even when designed for the small energies needed for instance for producing single welding spots on watch parts. Usually a number of welding spots are required even for assemblage of small parts in order to obtain symmetrical conditions. With prior apparatus this requirement necessitated displacement of the workpiece or of the laser source between single welding operations on one workpiece, this being unfavorable and time consuming and necessitating a relatively complicated mechanical equipment. If a number of welding operations or other working by laser pulses are effected one after the other on one workpiece, asymmetric conditions may well produce due to asymmetric thermic effects in the workpiece and or due to differences in the energy of succeeding laser pulses.

This invention aims in overcoming the above drawbacks of prior laser-working methods and devices by providing a single laser source for producing a laser beam, subdividing this laser beam into a number of individual laser beams suitable for treating a single place of at least one workpiece and directing each of said individual laser beams onto one place to be treated, a number of places of at least one workpiece being thus simultaneously treated by laser energy from said laser source. In this way the utilization and efficiency of the laser source and the output of workpieces is substantially increased. Since it is no longer necessary to relatively displace the source and workpiece between different succeeding operations, the mechanism of the treating installation may appreciably be simplified. When treating all places of one workpiece simultaneously by laser beams originating from one single initial beam the same energy will simultaneously act in all working places, this resulting in a homogenous workpiece without any asymmetry or initial stresses. However, it is also possible to divide the initial laser beam into individual beams of different intensity for simultaneously working places of a workpiece under different conditions. A number of pieces may be treated simultaneously, this allowing to substantially increase the output.

The device according to this invention is characterized substantially by deflecting means adjustable into various deflecting positions and deflecting angles in the path of each of said individual laser beams, means for focusing said individual laser beams into individual working pieces and means for adjustment of said deflecting means. The said adjustable deflecting means allow adjustment of the individual laser beams and their focal points respectively to different places, the relative position of the focal points being variable within wide limits, this allowing adjustment of the device for the treatment of various workpieces differing in shape and size. Therefore, this invention not only brings a substantial improvement in efficiency, output and quality but also allows treatment of a wide variety of workpieces by simple adjustment of the same treating device.

This invention will now be explained in detail with reference to the accompanying drawing illustrating, by way of example, an embodiment of the invention.

FIG. 1 schematically shows the principle of the device and

FIG. 2 to 4 are various views of a deflecting unit of the device.

As shown in FIG. 1 a laser beam 1 emitted by a source not shown in the drawing, falls onto a first mirror 2 inclined by 45° relatively to the axis of beam 1. A semitransparent mirror 2 is used by which half of the light beam 1 is reflected in horizontal direction and forms an individual laser beam 3. The beam 1' passing through mirror 2 is totally reflected by another mirror 4 inclined by 45° relatively to the axis of beam 1 and 1' respectively. Beam 1' is thus reflected into horizontal direction and forms a reflected individual beam 5. Beams 3 and 5 are then deflected by mirrors 6 and 7 respectively downwardly in directions converging towards the axis of the initial beam 1. Deflected beams 3' and 5' cross each other in an objective 8 schematically illustrated, and are focused in two places 9 and 10 respectively of a workpiece 11. Any desired operation may be effected, for instance boring or welding for assembling two or more parts.

For adjusting the position of each focal point or working place 9 and 10, mirrors 6 and 7 may be adjusted in horizontal direction, that is transversely to the axis of the initial beam 1, and the inclination of such mirrors may also be adjusted in order that the beams 3' and 5' are always directed toward and through the common objective 8. Since a relatively complicated adjustment of two positions is required, it is desirable to simplify this adjustment as much as possible by mechanical coordination of the translatory and angular displacement of the mirrors. FIGS. 2 to 4 illustrate an adjusting unit of this type. Each mirror 6 or 7 is fixed in a frame 12 pivotably mounted in a carriage 13 by means of a shaft 14. The carriage 13 may be displaced along a guiding rod 15 and an adjusting spindle 16. Guide rod 15 is fixed in two blocks 17 and 18 mounted on a base 19. The spindle may be driven by a belt not shown in the drawing, running over a pulley 20 fixed on spindle 16.

A lever 21 is fixed to the one end of shaft 14, this lever having a pin 22 engaging a control ruler 23 mounted on base 19 by means of two blocks 24. A spring 25 maintains pin 22 in close engagement with ruler 23. The mirrors 2 and 4 respectively are mounted at one end of base 19.

When the spindle 16 is rotated by pulley 20, the carriage 13 with mirrors 6 or 7 is horizontally displaced along the guide rod 15 and spindle 16. During this displacement pin 22 slides along the slightly inclined ruler 23 so that the frame 12 with mirror 6 or 7 is automatically turned into a properly inclined position for directing beam 3' or 5' through the objective 8. The control surface of ruler 23 may be straight as shown in FIG. 3 or this surface may be curved in accordance with the requirements of the system. The spindles 16 of both systems may be driven from a single common control device for effecting an equivalent displacement and adjustment of both mirrors 6 and 7, but individual control, particularly individual manual control of both mirrors or any number of mirrors of the system may be provided for.

While the embodiment schematically illustrated in FIG. 1 has two reflected beams 3' and 5' only for simplicity of the drawing, any other number of mirrors and individual laser beams may be used. Instead of using a totally reflecting lower mirror 4 a partially transparent mirror might be used such that a portion of the initial beam 1 and 1' respectively would directly pass through mirrors 4 into the objective 8. For further simplifying the explanation and illustration, it has been admitted that beams 3' and 5' are in the same plane with beam 1, but the assembly of mirrors illustrated in FIGS. 2 to 4 may be disposed in any desired direction. As an example, three laser beams may be used of which the focal points are uniformly distributed along a circular line and spaced by angles of 120° from each other. In any case, the units shown in FIGS. 2 to 4 would be mounted on a frame together with the laser source, but it is belived that this is so obvious that illustration is not deemed necessary.

A device of this type may for instance by used for welding an annular part onto a cylindrical part, these parts being loosely assembled and then simultaneously welded by three spots bridging the circular joint between the pieces.

Usually a number of beams of the same intensity are needed, but it is possible to provide beams of different intensities for simultaneously effecting different operations. In this case mirrors 2, 4 and any other partially or fully reflecting mirrors in the path of the original beam 1 have to be designed each for reflection of the light intensity required for a particular operation.

As set out above, this device is particularly advantageous for simultaneously effecting a number of operations on one piece, for instance for assembling parts by welding. This application of the device is not only suitable for assembling mechanical parts, but electrical parts may as well be welded in miniaturized circuits or integrated circuits. Instead of simultaneously treating a number of places of a single piece or of a single assembly of parts, a number of similar parts or workpieces may simultaneously be treated in a similar manner in order to increase the output of a treating plant. In the latter case separate objectives may be provided for each individual laser beam for focusing such beams in places suitably spaced from each other for treating a number of pieces.

The partially transparent mirrors may be replaced by other optical elements, for instance double refracting crystals, and the totally reflecting mirrors may be replace by prisms.

We claim:

1. A device for treating workpieces by laser energy, comprising:
   a. a laser source for producing a laser beam and directing it toward said workpiece;
   b. focusing means positioned intermittent said laser source and said workpiece for focusing laser energy incident thereon onto said workpiece; and
   c. at least a pair of beam splitting and beam redirection units positioned between said source and focusing means, each said unit including (1) beam-splitting means positioned in said laser beam and adapted to establish a subbeam by reflecting at least part of said original beam along an axis of said unit extending at right angles to the original beam direction, (2) a carriage displaceable along said axis, (3) subbeam reflection means mounted in said carriage and orientable to reflect said subbeam through said focusing means, (4) means for displacing said carriage, and (5) means for adjusting the angular orientation of said reflection means simultaneous with the displacement of said carriage, whereby to direct said subbeam through said focusing means irrespective of the position of said carriage along said axis and thereby correspondingly displace the focused subbeam at said workpiece.

2. Apparatus in accordance with claim 1 wherein said beam splitting and redirection units are two in number.

3. Apparatus in accordance with claim 1, wherein the means for displacing said carriages of each splitting and beam redirection unit are driven from a common source, whereby said carriages are placed simultaneously.

4. Apparatus in accordance with claim 3, wherein said beam splitting and redirection units are three in number and said axes thereof are coplanar but extend at oblique angles with respect to one another, whereby the loci of the focused subbeams at said workpiece define circles of radii in accordance with the displaced positions of said carriages.

5. Apparatus in accordance with claim 3, wherein said subbeam reflection means comprises a rotatable reflector; and said means for adjusting the angular orientation of said reflection means comprises a linearly rising cam surface extending along said axis, and an arm connected at one end thereof to rotate the axis of said reflector, the other end of said arm having a cam follower engaging said cam surface, displacement of said carriage moving said follower along said surface and rotating said axis and said reflector.

* * * * *